US008802754B2

(12) United States Patent
Nie et al.

(10) Patent No.: US 8,802,754 B2
(45) Date of Patent: Aug. 12, 2014

(54) STARCH-PLASTIC COMPOSITE RESINS AND PROFILES MADE BY EXTRUSION

(75) Inventors: Li Nie, Parkville, MO (US); Sukh D. Bassi, Atchison, KS (US); Clodualdo C. Maningat, Platte City, MO (US); Michael Douglas Parker, Lawrence, KS (US)

(73) Assignee: MGPI Processing, Inc., Atchison, KS (US)

( * ) Notice: Subject to any disclaimer, the term of this patent is extended or adjusted under 35 U.S.C. 154(b) by 0 days.

(21) Appl. No.: 11/339,367

(22) Filed: Jan. 25, 2006

(65) Prior Publication Data

US 2006/0194902 A1 Aug. 31, 2006

Related U.S. Application Data

(60) Provisional application No. 60/646,931, filed on Jan. 25, 2005.

(51) Int. Cl.
C08L 3/00 (2006.01)
C08L 89/00 (2006.01)
D21H 19/54 (2006.01)

(52) U.S. Cl.
USPC .......................................................... 524/47

(58) Field of Classification Search
USPC .......................................................... 524/47
See application file for complete search history.

(56) References Cited

U.S. PATENT DOCUMENTS

| | | | |
|---|---|---|---|
| 3,728,294 A | 4/1973 | Leven | |
| 3,981,833 A * | 9/1976 | Lark | 524/47 |
| 4,072,535 A * | 2/1978 | Short et al. | 106/206.1 |
| 4,139,505 A * | 2/1979 | Rogols et al. | 524/47 |
| 4,144,304 A | 3/1979 | Dereppe et al. | |
| 4,340,442 A * | 7/1982 | Hart et al. | 162/146 |
| 4,941,922 A * | 7/1990 | Snyder | 106/211.1 |
| 5,142,835 A * | 9/1992 | Mrocca | 52/309.12 |
| 5,312,850 A | 5/1994 | Iovine et al. | |
| 5,321,064 A | 6/1994 | Vaidya et al. | |
| 5,446,078 A * | 8/1995 | Vaidya et al. | 524/17 |
| 5,449,708 A * | 9/1995 | Schiltz | 524/47 |
| 5,461,093 A * | 10/1995 | Yoo et al. | 524/47 |
| 5,510,401 A * | 4/1996 | Dehennau et al. | 524/47 |
| 5,523,293 A | 6/1996 | Jane et al. | |
| 5,665,152 A | 9/1997 | Bassi et al. | |
| 5,874,486 A * | 2/1999 | Bastioli et al. | 523/128 |
| 5,993,972 A * | 11/1999 | Reich et al. | 428/423.1 |
| 6,008,276 A * | 12/1999 | Kalbe et al. | 524/47 |
| 6,025,417 A * | 2/2000 | Willett et al. | 524/17 |
| 6,124,384 A * | 9/2000 | Shiraishi et al. | 524/35 |
| 6,150,438 A * | 11/2000 | Shiraishi et al. | 524/35 |
| 6,169,149 B1 | 1/2001 | Craig et al. | |
| 6,184,271 B1 | 2/2001 | Westland et al. | |
| 6,210,741 B1 | 4/2001 | van Lengerich et al. | |
| 6,211,325 B1 * | 4/2001 | Sun et al. | 528/66 |
| 6,231,970 B1 | 5/2001 | Andersen et al. | |
| 6,242,102 B1 * | 6/2001 | Tomka | 428/451 |
| 6,254,958 B1 * | 7/2001 | Yoshida et al. | 428/64.2 |
| 6,348,524 B2 * | 2/2002 | Bastioli et al. | 524/47 |
| 6,362,256 B2 | 3/2002 | Willett et al. | |
| 6,375,881 B1 * | 4/2002 | Foelster et al. | 264/141 |
| 6,410,618 B2 | 6/2002 | Uryu et al. | |
| 6,472,497 B2 | 10/2002 | Loercks | |
| 6,475,418 B1 | 11/2002 | Tsai et al. | |
| 6,495,631 B1 | 12/2002 | Randall et al. | |
| 6,515,054 B1 * | 2/2003 | Matsushita et al. | 524/167 |
| 6,548,577 B2 * | 4/2003 | Kitayama et al. | 524/35 |
| 6,579,934 B1 * | 6/2003 | Wang et al. | 525/63 |
| 6,610,765 B1 * | 8/2003 | Pfaendner et al. | 524/108 |
| 6,617,449 B2 | 9/2003 | Tanaka | |
| 6,620,865 B2 | 9/2003 | Westland et al. | |
| 6,682,789 B2 | 1/2004 | Godavarti et al. | |
| 6,727,300 B2 * | 4/2004 | Sassi | 524/103 |
| 6,730,724 B1 | 5/2004 | Bastioli et al. | |
| 6,844,380 B2 | 1/2005 | Favis et al. | |
| 6,890,872 B2 | 5/2005 | Bond et al. | |
| 7,026,379 B2 | 4/2006 | Oyasato et al. | |
| 7,176,251 B1 * | 2/2007 | Bastioli et al. | 524/47 |
| 2001/0007883 A1 | 7/2001 | Willett et al. | |
| 2001/0014711 A1 * | 8/2001 | Levy | 524/406 |
| 2001/0039303 A1 | 11/2001 | Loercks et al. | |
| 2002/0032253 A1 * | 3/2002 | Lorenz et al. | 524/11 |
| 2002/0094444 A1 | 7/2002 | Nakata et al. | |
| 2003/0100635 A1 * | 5/2003 | Ho et al. | 524/47 |
| 2003/0114575 A1 * | 6/2003 | Teutsch | 524/494 |
| 2003/0154883 A1 * | 8/2003 | MacKey et al. | 106/215.1 |
| 2003/0216492 A1 | 11/2003 | Bowden et al. | |
| 2004/0002569 A1 * | 1/2004 | Kitano et al. | 524/494 |
| 2004/0009218 A1 | 1/2004 | Kitamura et al. | |

(Continued)

FOREIGN PATENT DOCUMENTS

| | | |
|---|---|---|
| EP | 0530987 | 3/1993 |
| EP | 0897943 | 2/1999 |
| EP | 1270618 | 1/2003 |
| JP | 48083176 | 6/1973 |
| WO | WO0112723 | 2/2001 |
| WO | WO0179322 A1 | 10/2001 |
| WO | WO03074604 A1 * | 12/2003 |
| WO | WO/2007/050560 A2 | 5/2007 |

OTHER PUBLICATIONS

Pakistan Journal of Biological Sciences 4, (6), 693-695, 2001.*
Journal of Applied Polymer science, 64, 1685-1695, 1994.*
PCT/US06/041391 International Preliminary Report on Patentability; Feb. 1, 2008; 9 pages.
PCTUS2006/041391 International Search Report and Written Opinion, Mailed Apr. 5, 2007, 10 pages.
PCTUS2006/041391 Response to Written Opinion Aug. 24, 2007, 13 pages.
U.S. Appl. No. 11/585,369 Office Action mailed May 24, 2007, 12 pages.
U.S. Appl. No. 11/585,369 Response to Office Action filed Aug. 24, 2007, 12 pages.

(Continued)

Primary Examiner — Liam J Heincer
(74) Attorney, Agent, or Firm — Lathrop & Gage LLP

(57) ABSTRACT

Composite materials containing non-plasticized, non-gelatinized starch, a compatibilizer and a synthetic resin, such as polyethylene and/or polypropylene, may be used to make wood replacement products for use as construction materials.

54 Claims, No Drawings

(56) References Cited

U.S. PATENT DOCUMENTS

| | | | |
|---|---|---|---|
| 2004/0014844 A1* | 1/2004 | Helbling et al. | 524/47 |
| 2004/0072924 A1* | 4/2004 | Sigworth et al. | 523/200 |
| 2004/0171719 A1* | 9/2004 | Neivandt et al. | 524/47 |
| 2005/0019545 A1* | 1/2005 | Riebel | 428/304.4 |
| 2006/0273495 A1 | 12/2006 | Topolkaraev et al. | |
| 2007/0092745 A1 | 4/2007 | Nie et al. | |

OTHER PUBLICATIONS

U.S. Appl. No. 11/585,369 Office Action mailed Oct. 3, 2007, 10 pages.

U.S. Appl. No. 11/585,369 Response to Office Action filed Oct. 30, 2007, 8 pages.

U.S. Appl. No. 11/585,369 Office Action mailed Dec. 5, 2007, 11 pages.

U.S. Appl. No. 11/585,369 Response to Office Action filed Jun. 5, 2008; 10 pages.

U.S. Appl. No. 11/585,369 Office Action mailed Sep. 15, 2008; 11 pages.

U.S. Appl. No. 11/585,369 Response to Office Action filed Mar. 16, 2009; 8 pages.

U.S. Appl. No. 11/585,369 Office Action mailed May 19, 2009; 8 pages.

U.S. Appl. No. 11/585,369 Response to Office Action filed Nov. 20, 2009; 10 pages.

U.S. Appl. No. 11/585,369 Office Action mailed Feb. 3, 2010; 10 pages.

U.S. Appl. No. 11/585,369 Response to Office Action filed Aug. 3, 2010; 14 pages.

U.S. Appl. No. 11/585,369 Office Action mailed Oct. 13, 2010; 11 pages.

U.S. Appl. No. 11/585,369 Response to Office Action filed Apr. 13, 2011; 17 pages.

U.S. Appl. No. 11/585,369 Office Action mailed May 11, 2011; 12 pages.

U.S. Appl. No. 11/585,369 Response to Office Action filed Nov. 14, 2011; 28 pages.

U.S. Appl. No. 11/585,369 Office Action mailed Mar. 7, 2012; 15 pages.

U.S. Appl. No. 11/585,369 Response to Office Action filed Sep. 7, 2012; 35 pages.

U.S. Appl. No. 11/585,369 Office Action mailed Oct. 17, 2012; 13 pages.

U.S. Appl. No. 11/585,369 Response to Office Action filed Apr. 17, 2013; 35 pages.

U.S. Appl. No. 11/585,369 Office Action mailed May 29, 2013; 13 pages.

U.S. Appl. No. 11/585,369 Response to Office Action filed Nov. 29, 2013; 8 pages.

U.S. Appl. No. 11/585,369 Office Action mailed Jan. 28, 2014; 9 pages.

\* cited by examiner

STARCH-PLASTIC COMPOSITE RESINS AND PROFILES MADE BY EXTRUSION

RELATED APPLICATIONS

This application claims priority to U.S. application Ser. No. 60/646,931, filed Jan. 25, 2005, which is incorporated herein by reference.

BACKGROUND

1. Field of the Invention

The present invention pertains to the field of composite materials and, more particularly, to composites containing fillers mixed with a plastic resin or the like. The composites may be shaped into products for use in the construction industry, such as artificial boards or panels that may optionally be embossed to provide a wood grain texture.

2. Description of the Related Art

Wood-plastic composites are widely used in residential and commercial structures for decking board, fencing, railing and so forth. In the manufacture of these products, wood flour or wood fiber is mixed with a resin and the composite is extruded. Warm extruded profiles may be embossed to create a real wood or wood grain appearance. Adding wood flour or wood fiber helps reduce cost, improve flex modulus and add wood appearance.

Initially, these products represented a marked cost savings over actual wood when used for the same purposes. Over time, however, the cost of wood flour and wood fiber has increased dramatically. A decade ago, wood flour and wood fiber were little-used by-products of the paper and lumber industries. Today, the opposite is true; trees are grown for the specific purpose of direct conversion into wood flour or wood fiber for use in wood-plastic composites.

In addition to their increasing cost, wood-plastic composites have several drawbacks. The use of wood as a reinforcing filler in composites creates a strong wood color that is very difficult to change in the presence of a plastic resin. For example, significant amounts of titanium dioxide are needed in formulations where a light color is desired. Titanium dioxide is an expensive additive, and its use in large quantities creates an unnatural look with a lackluster appearance. Further, abundant quantities of lubricant are needed to allow the composite to be extruded into a board, and the resulting board is not completely hydrophobic. Wood flour and wood fiber can both adsorb a large amount of water. Wood-plastic composite profiles also have a stronger than normal wood smell due to high process temperatures used in the production process. This makes wood-plastics composites unattractive for many in-house applications.

In an attempt to replace wood flour and wood fiber in composites, various agricultural materials have been used. For example, pure cellulose fibers have been used to impart a light color on composite profiles. However, pure cellulose fibers are very costly and difficult to process at high fiber content. Composite profiles with high cellulose fiber content are thus not commercially viable as replacement construction materials.

SUMMARY

The present instrumentalities advance the art and overcome the problems that are outlined above.

In one aspect, a manufactured product for use as a wood substitute, includes from 20-80% by weight starch; from 0.5-4% by weight of a compatibilizer; from 20-78% by weight of a synthetic resin; and from 0-15% by weight fibers.

In one aspect, a method of making a substitute wood product includes the steps of combining ingredients including from 20-80% by weight starch, from 0.5-4% by weight of a compatibilizer, from 20-78% by weight of a synthetic resin, and from 0-15% by weight fibers; processing the ingredients to achieve a melt temperature of the synthetic resin; and extrusion shaping the substitute wood product.

In another aspect, a manufactured product for use as a wood substitute, includes from 20-80% by weight granular starch; from 20-78% by weight of a synthetic resin; from 0.5-4% by weight of a compatibilizer; from 0-15% by weight of a fiber; from 0.5-4% by weight of a lubricant, said lubricant containing no metal ions; from 0-2% by weight of a foaming agent; from 0-1% by weight of a colorant; from 0-5% by weight talc; from 0-2% by weight of an antimicrobial agent; and from 0-0.3% by weight of a UV stabilizer.

In another aspect, a method of making a substitute wood product includes the steps of combining ingredients including from 20-80% by weight predried starch, from 20-78% by weight of a synthetic resin, from 0.5-4% by weight of a compatibilizer, said compatibilizer having a melt index of 2-150, from 0-15% by weight fiber, from 0.5-4% by weight of a lubricant, said lubricant containing no metal ions, from 0-2% by weight of a foaming agent, from 0-1% by weight of a colorant, from 0-5% by weight talc, from 0-2% by weight of an antimicrobial agent, and from 0-0.3% by weight of a UV stabilizer; processing the ingredients to achieve a melt temperature of 260-400° F.; and extrusion shaping the substitute wood product.

In yet another aspect, a manufactured product for use as a wood substitute includes from 20-80% by weight granular starch; from 20-78% by weight of a synthetic resin; from 0.5-4% by weight of a compatibilizer; and from 0-15% by weight of a fiber.

In yet another aspect, a method of making a substitute wood product includes the steps of combining ingredients including from 20-80% by weight predried starch, from 20-78% by weight of a synthetic resin, from 0.5-4% by weight of a compatibilizer, said compatibilizer having a melt index of 2-150, and from 0-15% by weight of a fiber; processing the ingredients to achieve a melt temperature of 260-400° F.; and extrusion shaping the substitute wood product.

DETAILED DESCRIPTION

The present formulations utilize starch as a filler, where the starch is neither gelatinized by moisture nor plasticized by a plasticizing agent, such as glycerine or propylene glycol. The use of starch as a filler is economical and gives a very light color to composites, such that the composites can be easily made white with the addition of a minimal amount of titanium dioxide. Further, the use of starch as a filler improves modulus and dimensional stability of composite boards; the result is improved nailing and sawing qualities.

Suitable starches for use in the disclosed formulations include those that are cost effective as fillers, for example, wheat, corn, rice, tapioca, and potato. Additionally, starches that are chemically, physically and/or genetically modified may be used.

Starch as a filler does not have as good a reinforcing effect as fibers for flex modulus. Thus, adding a small amount of fiber helps overcome this problem in some embodiments. The disclosed formulations may, for example, include fibers selected from the group consisting of glass fibers, cotton, hardwood fibers, softwood fibers, flax, abaca, sisal, ramie, hemp, bagasse, recycled paper fibers, cellulose fibers, polymer fibers, and mixtures thereof.

Resins for use in the disclosed formulations include those selected from the group consisting of polyolefines, polyethylene, polypropylene, polyurethane, polystyrene, polyamides, polyesters, and combinations thereof. It will be appreciated that combinations of polymers may include both physical mixtures and chemical combinations, e.g., block-copolymers.

Compatibilizers are generally polymers that are functionalized with grafting compounds. For example, maleic anhydride is a grafting compound that may be reacted with polyethylene or polypropylene to create the compatibilizers maleated polyethylene or maleated polypropylene. The grafting compound facilitates binding of the starch to the compatibilizer, while the polymer portion of the compatibilizer interacts with the resin component of the composite.

Although reference has been made to maleic anhydride as a grafting compound and to polyethylene and polypropylene as suitable compatibilizer polymers, one skilled in the art will appreciate that numerous other grafting compounds and polymers may be used to create suitable compatibilizers.

Generally speaking, composite resins described herein have bulk densities in the range of 25-45 lbs/ft$^3$. The density of an extrusion profile made from one of these resins may be controlled to fall within a range of 0.7-1.1 g/cm$^3$.

The following examples teach by way of illustration, and not by limitation, to illustrate preferred embodiments of what is claimed.

Example 1

Starch-polyethylene Composite Resin and Profile Extrusion

Formulation for Composite Resins:

| | |
|---|---|
| Native corn starch* | 45% |
| TC2500 (cellulose fiber) | 15% |
| High density polyethylene (4 melt) | 33% |
| Polybond ® 3109** (compatibilizer) | 3% |
| Talc | 2% |
| Titanium Dioxide | 1% |
| TPW 113 (lubricant) | 1% |

*Corn starch is predried by a flash tube dryer to 3.5% moisture.
**Polybond ® 3109 is a maleic anhydride grafted linear low density polyethylene (1.0 wt. % MA).

Polyethylene, Polybond® 3109, titanium dioxide, talc, and TPW 113 were fed to the main feeding hopper of a ZE75A-UT twin screw extruder. The plastic pellets were melted in the plasticating zone and mixed with other ingredients. The barrel temperature at the die end was set at 270° F. Predried corn starch and cellulose were fed by a side feeder. Venting ports were provided for moisture and air escape. A vacuum stuffer was used near the barrel end to pull moisture. The melt was pelletized by an underwater pelletizing system. The pellets coming out of the spin dryer of the underwater system were sent to a belt dryer for further drying. The belt dryer was kept at about 230° F. Final moisture in the pellets was controlled to less than 1.0%.

The above described resin was used for making profile extruded fencing boards with a die dimension of 5/8"×5⅜" on a single screw extruder (3.5" Prodex) using the following formulation:

| | |
|---|---|
| Pellets (as above) | 97.5% |
| TWP 113 (lubricant) | 2.5% |

The barrel temperature was set at 265° F. The melt profile passed through a water spray chamber, which provided slow surface cooling, and then through a heated embossing roll, which imparted wood grain texture or another surface pattern. Following the embossing, the board was cut with a flying saw. The final profile extruded fencing board had an excellent white color.

Example 2

Starch-polyethylene Direct Profile Extrusion

Formulation for Composite Resins:

| | |
|---|---|
| Native corn starch* | 55% |
| TC2500 (cellulose fiber) | 5% |
| High density polyethylene (0.5 melt) | 30.5% |
| Polybond ® 3109 (compatibilizer) | 3% |
| Talc | 2% |
| Titanium Dioxide | 1% |
| TPW 113 (lubricant) | 3.5% |

*Corn starch is predried by a flash tube dryer to 3.5% moisture.
**Polybond ® 3109 is a maleic anhydride grafted linear low density polyethylene (1.0 wt. % MA).

Polyethylene, Polybond® 3109, titanium dioxide, talc, and TPW 113 were fed to the main feeding hopper of a ZE75A-UT twin screw extruder. The plastic pellets were melted in the plasticating zone and mixed with other ingredients. The barrel temperature at the die end was set at 280° F. Predried corn starch and cellulose were fed by a side feeder. Venting ports were provided for moisture and air escape. A vacuum stuffer was used near the barrel end to pull moisture.

The melt passed through a profile shape for standard decking board that lead to a water spray chamber, which provided slow surface cooling. The decking board was then passed through a heated embossing roll, which imparted wood grain texture or another surface pattern. Following the embossing, the board was cut with a flying saw. The final profile extruded decking board had an excellent white color.

Example 3

Starch-polypropylene Composite Resin and Profile Extrusion

Formulation for Composite Resins:

| | |
|---|---|
| Native corn starch* | 50% |
| TC2500 (cellulose fiber) | 10% |
| Homo-polypropylene (2 melt) | 33% |
| Polybond ® 3200** (compatibilizer) | 3% |
| Talc | 2% |
| Titanium Dioxide | 1% |
| TPW 113 (lubricant) | 1% |

*Corn starch is predried by a flash tube dryer to 3.5% moisture.
**Polybond ® 3200 is a maleic anhydride grafted polypropylene (1.0 wt. % MA).

Polypropylene, Polybond® 3200, titanium dioxide, talc, and TPW 113 were fed to the main feeding hopper of a ZE75A-UT twin screw extruder. The plastic pellets were melted in the plasticating zone and mixed with other ingredients. The barrel temperature at the die end was set at 330° F. Predried corn starch and cellulose were fed by a side feeder.

Venting ports were provided for moisture and air escape. A vacuum stuffer was used near the barrel end to pull moisture. The melt was pelletized by an underwater pelletizing system. The pellets coming out of the spin dryer of the underwater system were sent to a belt dryer for further drying. The belt dryer is kept at about 230° F. Final moisture in the pellets was controlled to less than 1.0%.

The above described resin was used for making profile extruded foamed fencing boards with a die dimension of 5/8"×5 3/8" on a single screw extruder (3.5" Prodex) using following formulation:

| | |
|---|---|
| Pellets (as above) | 96.1% |
| GMA411 (foaming agent) | 1.0% |
| TWP 113 (lubricant) | 2.5% |
| Hostanox ® O16 (phenolic antioxidant) | 0.1% |
| Everlight 91 (UV stabilizer) | 0.3% |

The barrel temperature was set at 330° F. The foamed melt profile passed through a water spray chamber, which provided slow surface cooling, and then through a heated embossing roll, which imparted wood grain texture or another surface pattern. Following the embossing, the board was cut with a flying saw. The density of the board was 0.91 g/cm$^3$ and the final profiled extruded fencing board had an excellent white color.

Example 4

Formulations for Starch-polyethylene Composites

Composite resins for direct profile extrusion:
20-80% native starch,
20-78% polyethylene such as high density polyethylene, low density polyethylene with a melt index of 0.25-15,
0-15% fibers such as chopped glass fibers or cellulose fibers,
0.5-4% maleated polyethylene with a melt index of 2-150,
0.5-4% lubricant/lubricants that contains/contain no metal ions,
0-1% titanium dioxide or other colorants/pigments,
0-2% foaming agents,
0-5% talc,
0-2% antimicrobial agents, i.e., zinc borate,
0-0.3% UV stabilizers and antioxidants.
Profile extrusion using compound resins:
90-100% composite resin,
0-4% lubricants,
0-15% fibers,
0-2% foaming agents,
0-1% pigments,
0-5% talc,
0-2% antimicrobial agents, i.e., zinc borate.

Example 5

Processing of Starch-resin Composites

Composite resins for direct profile extrusion:
20-80% native starch,
20-78% polypropylene with a melt index of 0.25-10,
0-15% fibers such as chopped glass fibers or cellulose fibers,
0.5-4% maleated polypropylene with a melt index of 2-150,
0.5-4% lubricant/lubricants that contains/contain no metal ions,
0-2% foaming agents,
0-1% titanium dioxide or other colorants/pigments,
0-5% talc,
0-2% antimicrobial agents, i.e., zinc borate,
0-0.3% UV stabilizers and antioxidants.
Profile extrusion using compound resins:
90-100% composite resin
0-4% lubricants
0-15% fibers
0-1% pigments
0-2% foaming agents
0-5% talc,
0-2% antimicrobial agents, i.e., zinc borate.

Example 6

Processing of Composites

Commercially available starch may be pre-dried in a flash tube dryer or tornesh dryer to a moisture content of 1-5%. Resins, together with some additives, are fed into the main extrusion hopper and melted in the plasticating zone. The filler, together with some additives, is fed with a side feeder after the resins have melted. The screws mix the filler, plastics and other minor ingredients. Venting ports are provided to release air and moisture in the melt. A down-stream venting port is provided with a vacuum stuffer.

For composite pellets, one may use die face pelleting, an underwater pelleting system, or a melt sheet dicer system depending on the formulation. The pellets may be dried or cooled to a moisture content of less than 1% before final packaging.

For profiles, melt flows out of a shaping die. The processing temperature for the melt is controlled from 260-380° F. for the polyethylene composite system and from 320-420° F. for the polypropylene composite system. The melt profile is cooled with calibration for shape size control. The hot profiles are further cooled with water cooling tanks or with water spray. After proper cooling, the profiles can be embossed with embossing rolls. After cutting with a synchronized sawing table, the profiles are cooled further on a cooling tower or table for final dimensional stability control.

Twin-screw compounders are used for making composite pellets. Twin-screw extruders are also used for direct profile extrusion, without an intermediate step of forming composite pellets. Both twin-screw and single-screw extruders are used for making profiles. Single-screw extruders are often used when composite pellets are the main feed.

Changes may be made in the above systems and methods without departing from the subject matter described in the Summary and defined by the following claims. It should thus be noted that the matter contained in the above description should be interpreted as illustrative and not limiting.

All references cited are incorporated by reference herein.

What is claimed:

1. A composition for producing a manufactured product for use as a wood substitute, comprising:
    from 35-80% by weight starch, wherein said starch has a moisture content of 2-5% and is not plasticized;
    from 0.5-4% by weight of a compatibilizer synthesized by reacting a polymer with a grafting compound; and
    from 20 to about 65% by weight of a synthetic resin.
2. The manufactured product made from the composition of claim 1 having an artificial wood grain texture.

3. The composition of claim 1, wherein the synthetic resin is selected from the group consisting of polyolefins, polyethylene, polypropylene, polyurethane, polystyrene, polyamides, polyesters, and combinations thereof.

4. The composition of claim 1, further comprising a fiber.

5. The composition of claim 4, wherein said fiber is selected from the group consisting of cotton, hardwood fibers, softwood fibers, flax, abaca, sisal, ramie, hemp, bagasse, recycled paper fibers, cellulose fibers, polymer fibers, and mixtures thereof.

6. The composition of claim 1, further comprising from 5-15% by weight of a fiber.

7. The composition of claim 1, wherein the starch source is selected from the group consisting of wheat, corn, rice, tapioca, potato and mixtures thereof.

8. The composition of claim 1, wherein the compatibilizer is selected from the group consisting of maleated polyethylene, maleated polypropylene, and mixtures thereof.

9. The composition of claim 1, wherein the composition comprises from 45-80% by weight starch.

10. The composition of claim 1, wherein the percent by weight of the starch is at least 10% greater than the percent by weight of the synthetic resin.

11. A composition for producing a manufactured product for use as a wood substitute, comprising:
from 35-80% by weight starch, wherein said starch has a moisture content of 2-5% and is not plasticized;
from 20 to about 46% by weight of a synthetic resin;
from 0.5-4% by weight of a compatibilizer synthesized by reacting a polymer with a grafting compound;
from 5-15% by weight of a fiber;
from 0.5-4% by weight of a lubricant, said lubricant containing no metal ions;
from 2% or less by weight of a foaming agent;
from 1% or less by weight of a colorant;
from 2-5% by weight talc;
from 2% or less by weight of an antimicrobial agent; and
from 0.3% or less by weight of a UV stabilizer.

12. The manufactured product made from the composition of claim 11 having an artificial wood grain texture.

13. The composition of claim 11, wherein the starch is selected from the group consisting of wheat, corn, rice, tapioca, potato and mixtures thereof.

14. The composition of claim 11, wherein the compatibilizer is selected from the group consisting of maleated polyethylene, maleated polypropylene, and mixtures thereof.

15. The composition of claim 11, wherein the synthetic resin is selected from the group consisting of polyolefins, polyethylene, polypropylene, polyurethane, polystyrene, polyamides, polyesters, and combinations thereof.

16. The composition of claim 11, wherein the composition comprises from 45-80% by weight starch.

17. The composition of claim 11, wherein the percent by weight of the starch is at least 10% greater than the percent by weight of the synthetic resin.

18. A composition for producing a manufactured product for use as a wood substitute, comprising:
from 35-80% by weight starch, wherein said starch has a moisture content of 2-5% and is not plasticized;
from 35 to about 60% by weight of a synthetic resin;
from 0.5-4% by weight of a compatibilizer synthesized by reacting a polymer with a grafting compound; and
from 5-15% by weight of a fiber.

19. The composition of claim 18, wherein the fiber is chosen from the group consisting of glass fibers, cotton, hardwood fibers, softwood fibers, flax, abaca, sisal, ramie, hemp, bagasse, recycled paper fibers, cellulose fibers, polymer fibers, and mixtures thereof.

20. The manufactured product made from the composition of claim 18 having an artificial wood grain texture.

21. The composition of claim 18, wherein the starch is selected from the group consisting of corn, wheat, tapioca, potato, and rice.

22. The composition of claim 18, wherein the starch is selected from chemically, physically and genetically modified starch.

23. The composition of claim 18, wherein the compatibilizer is selected from the group consisting of maleated polyethylene, maleated polypropylene, and mixtures thereof.

24. The composition of claim 18, wherein the synthetic resin is selected from the group consisting of polyolefins, polyethylene, polypropylene, polyurethane, polystyrene, polyamides, polyesters, and combinations thereof.

25. The composition of claim 18 further comprising at least one lubricant in an amount of 0.5-4%, said lubricant containing no metal ions.

26. The composition of claim 18 further comprising from 2% or less by weight of a foaming agent.

27. The composition of claim 18 further comprising 1% or less by weight of a colorant.

28. The composition of claim 18 further comprising from 2-5% by weight talc.

29. The composition of claim 18 further comprising 2% or less by weight of an antimicrobial agent.

30. The composition of claim 18 further comprising 0.3% or less by weight of a UV stabilizer.

31. The composition of claim 18, wherein the composition comprises from 45-80% by weight starch.

32. The composition of claim 18, wherein the percent by weight of the starch is at least 10% greater than the percent by weight of the synthetic resin.

33. A composition for producing a manufactured product for use as a wood substitute, comprising:
from 45-55% by weight starch that is not plasticized, wherein said starch has a moisture content of 2-5%;
from 0.5-4% by weight of a compatibilizer synthesized by reacting a polymer with a grafting compound; and
a synthetic resin.

34. The composition of claim 33, further comprising a fiber.

35. The composition of claim 34, wherein the fiber is present at about 5-15%.

36. The composition of claim 35, further comprising from 0.5-4% by weight of a lubricant, said lubricant containing no metal ions.

37. The composition of claim 36, further comprising a foaming agent.

38. The composition of claim 37, further comprising a colorant.

39. The composition of claim 38, further comprising talc.

40. The composition of claim 39, further comprising an antimicrobial agent.

41. The composition of claim 40, further comprising a UV stabilizer.

42. The composition of claim 33, wherein the percent by weight of the starch is at least 10% greater than the percent by weight of the synthetic resin.

43. A manufactured product for use as a wood substitute, comprising:
- 90-100% by weight composite resin;
- 4% or less by weight lubricants;
- 15% or less by weight fibers; and
- 1% or less by weight pigments;
- wherein said composite resin comprises
  - 35-80% by weight native starch that is not plasticized, wherein said starch has a moisture content of 2-5%,
  - 20 to about 65% by weight polymer with a melt index of 0.25-15 grams/10 min.,
  - 0.5-4% by weight maleated polymer with a melt index of 2-150 grams/10 min., and
  - 15% or less by weight fibers.

44. The manufactured product of claim 43 further comprising 2% or less by weight foaming agent.

45. The manufactured product of claim 43 further comprising 5% or less by weight talc.

46. The manufactured product of claim 43 further comprising 2% or less by weight antimicrobial agent.

47. The composite resin of claim 43 further comprising 0.5-4% by weight lubricant without metal ions.

48. The composite resin of claim 43 further comprising 2% or less by weight foaming agent.

49. The composite resin of claim 43 further comprising 1% or less by weight colorants/pigments.

50. The composite resin of claim 43 further comprising 5% or less by weight talc.

51. The composite resin of claim 43 further comprising 2% or less by weight antimicrobial agent.

52. The composite resin of claim 43 further comprising 0.3% or less by weight UV stabilizers and antioxidants.

53. The composite resin of claim 43, wherein the percent by weight of the starch is at least 10% greater than the percent by weight of the polymer.

54. The composite resin of claim 43, wherein the composite resin comprises from 45-80% by weight native starch.

* * * * *